Sept. 18, 1951     F. N. FISCHER ET AL     2,568,615
VALVE STOPPER
Filed Oct. 7, 1946
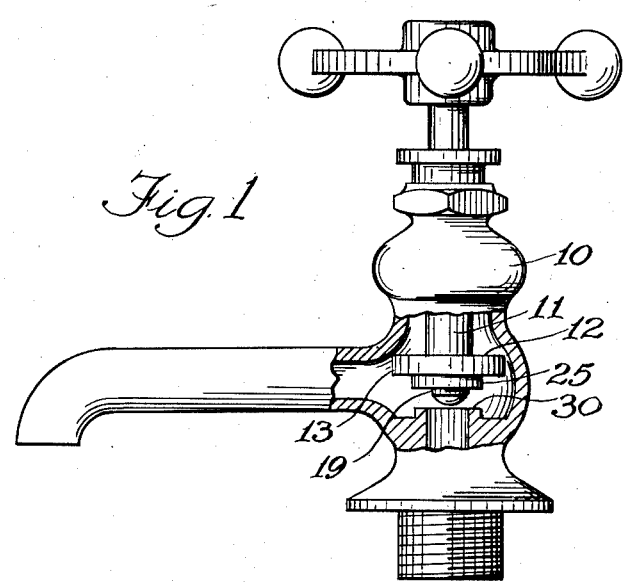
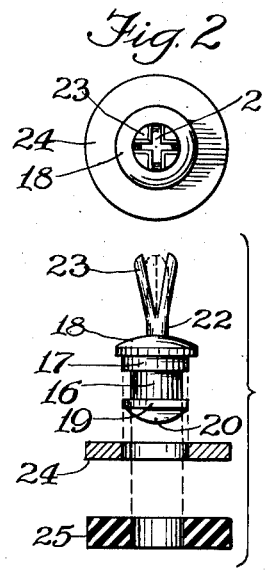
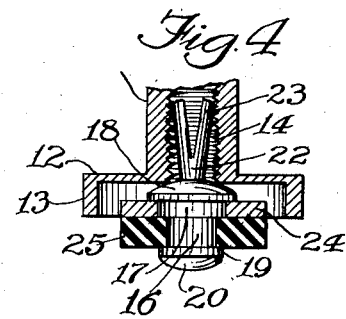
Inventors:
Frank N. Fischer
Joseph B. Kuzel
By Milo B. Stevens & Co.
Attorneys.

Patented Sept. 18, 1951

2,568,615

UNITED STATES PATENT OFFICE 2,568,615

VALVE STOPPER

Frank N. Fischer, Whiting, Ind., and Joseph B. Kuzel, Calumet City, Ill.

Application October 7, 1946, Serial No. 701,676

1 Claim. (Cl. 251—46)

Our invention relates to valves, and more particularly to faucets, and deals with improvements in the stoppers thereof in order to render the same efficient. Accordingly, one object of the present invention is to provide a stopper which is self-alining with respect to the stem of the faucet whereby to fit the seat thereof at all times and in the event that the stem has become out of line.

A further object is to provide a stopper which does not require the usual screw to secure its washer in place, the stopper having integral means for such purposes.

Another object is to design the novel stopper in a manner to fit valve seats which have become worn or corroded.

A still further object is to design the novel stopper along lines of simplicity and durability.

With the above objects in view, and any others which may suggest themselves from the description to follow, a better understanding of the invention may be had by reference to the accompanying drawing, in which—

Fig. 1 is a side view of a typical faucet, partly broken away, and showing the improved stopper in elevation;

Fig. 2 is a top view of the stopper;

Fig. 3 is a group illustration of the parts entering into the stopper and showing their relative positions prior to assembly; and Fig. 4 is a sectional view of the stopper, showing its position in relation to the stem of the faucet.

In accordance with the foregoing, specific reference to the drawing indicates the body of the faucet at 10 and its stem at 11. Usually, the stem is formed with an enlarged base 12 which is flanged at 13 to assume the form of an inverted cup; also the stem is internally threaded as indicated at 14.

The main portion of the improved stopper is in the form of a vertical pin 16 having an enlargement 17 at its upper end followed by a headpiece 18 which may be part-spherical as shown or simply conical. The lower end of the pin 16 is extended with a smaller headpiece 19 whose underside is preferably part-spherical, as indicated at 20. The headpiece 18 is extended upwardly at the center with a pin 22 which expands in upward direction with a cluster of four-wings 23, these being rounded on their outer sides.

The drawing shows that the enlargement 17 of the pin 16 receives a ring 24, the latter seating against the headpiece 18. The ring is tightly pressed onto the enlargement; or it may be constructed integrally with the same and its thickness is such that it will be closely confined between the ring 24 and the head 18. The ring 24 is followed by a rubber washer 25 mounted on the pin 16. It is understood that the washer will have sufficient elasticity to be forced over the lower headpiece 19 of the pin when it is to be mounted on the same. The washer will thus hold its place between the ring 24 and the headpiece without additional securing means.

The stopper as just described is applied to the stem 11 of the faucet by inserting the winged pin 22 into the same as clearly shown in Fig. 4. Fig. 1 shows that the stopper is now positioned with the washer 25 directly over the seat 30 of the faucet; and it follows that the descent of the stem 11 will cause the washer to fit the seat in the usual manner. However, should the seat become uneven from wear or corrosion, the four-winged pin 22 of the stopper will allow the same to change to the angle necessary to adapt the washer 25 to the deformed seat, while the domed or conical headpiece 18 will rotate or shift accordingly, furnishing a solid backing for the washer against stem 11. Also, the same action occurs in case the stem is out of line, but in such event the stopper adjusts itself to a position both in even relation with the stem and full engagement with the faucet seat.

The simplicity of the novel stopper is quite evident. It could be turned down from a single piece to include the ring 24 and render the metallic element of the stopper in a single piece. However, this would cause a considerable waste of metal from which the center portion of the stopper is reduced, and it is therefore more economical to form such central portion in one piece and apply a conventional ring 24 by pressure to fit the central portion as previously described.

In conclusion, it may be said that the improved stopper is an efficient article not only because of its self-alining property as explained above, but also because it eliminates the screw-type of fastening for the washer 25, such fastening often requiring tightening and having a destructive influence on the washer. In contrast, the present stopper is a unit which may be quickly applied and relied upon to function efficiently and without the necessity of attention until the washer wears down from extended use.

While we have described the invention along specific lines, various minor changes or refinements may be made therein without departing from its principle, and we reserve the right to employ such changes or refinements as come within the scope and spirit of the appended claim.

We claim:

In a valve having a seat and a tubular stem movable in relation to the same, a stopper between the inner end of the stem and the seat comprising a body portion formed with a convex headpiece overlying said end and adapted to slide over the same and render the stopper self-alining relative to the seat, a pin projecting from the center zone of the headpiece into the bore of the stem with a cluster of stems diverging toward the walls of said bore, the pin being relatively narrow to have latitude of travel relative to said walls during the sliding movement of the headpiece, said headpiece having a reduced portion to seat and provide a backing for a wide ring, a further reduced portion to seat and provide a backing for a yieldable washer of an area comparable to that of the ring, and a terminal enlargement forming a retainer for the washer.

FRANK N. FISCHER.
JOSEPH B. KUZEL.

REFERENCES CITED

The following references are of record in the file of this patent:

UNITED STATES PATENTS

| Number | Name | Date |
|---|---|---|
| 1,510,846 | Hoffman | Oct. 7, 1924 |
| 1,888,378 | Esnard | Nov. 22, 1932 |
| 1,953,675 | Erisman | Apr. 3, 1934 |

FOREIGN PATENTS

| Number | Country | Date |
|---|---|---|
| 27,909 | Great Britain | of 1908 |